A. WOEBER.
Carriage-Curtain Fastening.
No 68,925.  Patented Sept. 17. 1867
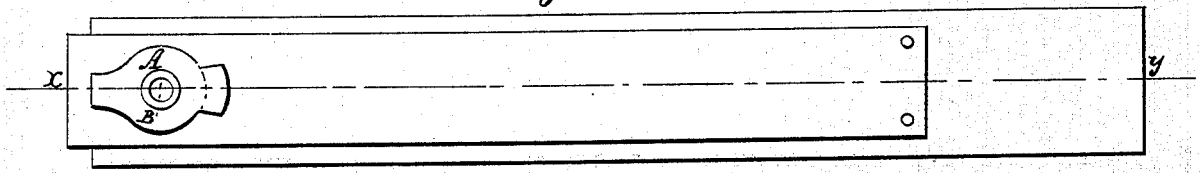
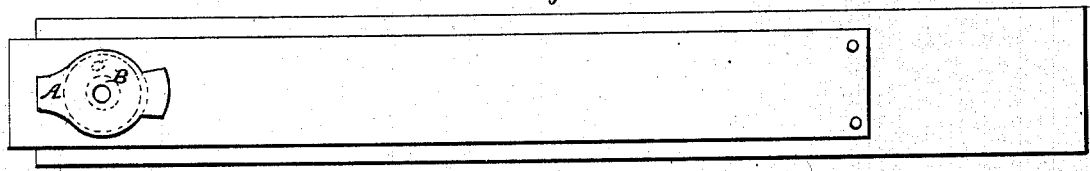
Witnesses.
W. Burris
Jesse Zepp
Inventor
Amanda Woeber
Atty G. B. Fowler

United States Patent Office.

AMANDUS WOEBER, OF DAVENPORT, IOWA.

Letters Patent No. 68,925, dated September 17, 1867.

---

IMPROVED CARRIAGE-CURTAIN FASTENER.

---

*The Schedule referred to in these Letters Patent and making part of the same.*

---

TO ALL WHOM IT MAY CONCERN:

Be it known that I, AMANDUS WOEBER, of the city of Davenport, in the county of Scott, and State of Iowa, have invented a new and useful Improvement on Carriage-Curtain Fasteners; and I do hereby declare that the following is a full, clear, and exact description of the construction and operation of the same, reference being had to the accompanying drawings, making a part of this specification, in which—

Figure 1 is an outside view of the curtain as fastened by a rubber flap, properly adjusted over the knob.

Figure 2 is a vertical section of the knob and fastener, as indicated by the line $x\,y$ in fig. 1.

Figure 3 is a view of the curtain unfastened, showing, by dotted lines, the metallic eyelet under the rubber.

Like letters in the different figures of the drawings indicate like parts.

My invention consists in providing a rubber flap with an eyelet hole therein, attached on the outside and over a metallic eyelet for the purpose of more securely fastening carriage-curtains.

To enable others skilled in the art to make and use my invention, I will proceed to describe its construction and operation.

A is a rubber flap, with eyelet hole B. C is a metallic eyelet, and D the knob or button. The rubber used ordinarily is from one-sixteenth to one-eighth of an inch in thickness; a less or greater thickness may be used when required. Of this rubber flaps are cut of suitable size and shape, and a round hole punched through the centre. The hole is made small enough, so that when the rubber is pressed over the knob or button, its elasticity will cause the rubber to close up and fit snugly to the neck of the knob. The rubber flap is attached, at the upper part thereof, to the curtain above, and so as to extend over the metallic eyelet, and is buttoned over the knob outside of the metallic eyelet, and thus fastens the curtain more securely and with less expense than the fasteners now in use.

The rubber used for this purpose heretofore was placed and fastened between the metallic eyelets, and was more liable to be pressed off the knob by an outward pressure of the curtain; and when by use it became worn and useless, it was not so readily removed and new rubber attached without injury to the curtains. My plan of attaching the rubber on the outside allows it to be made of sufficient size to possess the requisite elasticity and strength, so that when pressed over the knob after the curtain is buttoned, it closes tightly around the neck, and catches against the shoulders of the knob, when the curtain is pressed outward, so effectually closing up the space between the metallic eye and knob as to render it almost impossible to unbutton the curtain without first removing the rubber. When by use the rubber flap becomes impaired, it is readily removed and a new one attached, with very little expense and without injuring the curtains. They may also be readily attached and used upon carriages with the fasteners now in use, as well as upon new curtains.

Having thus fully described the construction and operation of my invention, what I claim therein as new, and desire to secure by Letters Patent, is—

1. Providing a rubber flap with eyelet hole attached outside and over metallic eyelet, substantially in the manner and for the purpose as herein described.

2. The rubber flap, with hole, as attached and arranged, in combination with metallic eyelet and curtain-knob or button, substantially in the manner and for the purpose as herein described.

AMANDUS WOEBER.

Witnesses:
 MORITZ GOLDFRIEDRICH,
 F. M. SMILEY.